(12) United States Patent
Hirst

(10) Patent No.: US 7,830,037 B2
(45) Date of Patent: Nov. 9, 2010

(54) GRID STABILISING SYSTEM

(75) Inventor: David R Hirst, Brighton (GB)

(73) Assignee: Responsiveload Ltd., East Sussex (GB)

( * ) Notice: Subject to any disclaimer, the term of this patent is extended or adjusted under 35 U.S.C. 154(b) by 970 days.

(21) Appl. No.: 10/572,830

(22) PCT Filed: Sep. 22, 2004

(86) PCT No.: PCT/EP2004/010639

§ 371 (c)(1),
(2), (4) Date: Dec. 11, 2006

(87) PCT Pub. No.: WO2005/029670

PCT Pub. Date: Mar. 31, 2005

(65) Prior Publication Data

US 2007/0198133 A1  Aug. 23, 2007

(30) Foreign Application Priority Data

Sep. 23, 2003  (GB) ................................. 0322278.3

(51) Int. Cl.
*H02J 3/14* (2006.01)
*H02J 1/04* (2006.01)
(52) U.S. Cl. .......................................... 307/39; 307/35
(58) Field of Classification Search .................... 307/39, 307/35; 700/295; 361/62
See application file for complete search history.

(56) References Cited

U.S. PATENT DOCUMENTS

| | | | | |
|---|---|---|---|---|
| 3,925,680 A | * | 12/1975 | Dixon | 307/39 |
| 4,023,043 A | * | 5/1977 | Stevenson | 307/38 |
| 4,345,162 A | | 8/1982 | Olson et al. | |

(Continued)

FOREIGN PATENT DOCUMENTS

DE  42 19 609 A  12/1993

(Continued)

OTHER PUBLICATIONS

Carissa L. Dragos, Grid-Friendly Technoloty at Colorado State university, 2002, pp. 1-8.*

(Continued)

*Primary Examiner*—Bao Q Vu
*Assistant Examiner*—Jue Zhang
(74) *Attorney, Agent, or Firm*—Alix, Yale & Ristas, LLP

(57) ABSTRACT

The invention provides control of an electric load receiving power from a grid. The frequency of the grid is detected and used to determine a stress level on the grid. A high frequency detection is indicative of too little a load for the electrical power being supplied to the grid and, therefore, a low stress condition. A high stress condition may exist if there is too much load for the power being supplied to the grid. Adjustment of the power consumption of the load is prevented if the high and/or low stress states is determined. If a critical high or low stress condition is determined, the load is either prevented from consuming power completely or the load is set to a maximum power consumption state, respectively. The benefits of the invention are increased if the device is combined with a load controller which operates to control power consumption based on grid frequency and a variable, which, for the particular load, is to be kept within controlled limits.

7 Claims, 2 Drawing Sheets

Enhancements to (components of)
Responsive Load Controller for Grid Stress
Anti Gaming - Block Diagram

U.S. PATENT DOCUMENTS

| | | | |
|---|---|---|---|
| 4,509,585 A * | 4/1985 | Carney et al. | 307/39 |
| 4,657,179 A * | 4/1987 | Aggers et al. | 307/39 |
| 4,694,192 A * | 9/1987 | Payne et al. | 307/39 |
| 5,293,755 A * | 3/1994 | Thomas | 307/39 |
| 5,598,349 A * | 1/1997 | Elliason et al. | 700/295 |
| 6,480,803 B1 * | 11/2002 | Pierret et al. | 307/39 |

FOREIGN PATENT DOCUMENTS

| | | |
|---|---|---|
| GB | 2 080 640 | 2/1982 |
| GB | 2 361 118 A | 10/2001 |
| JP | 57-049332 | 3/1982 |
| JP | 5-027536 | 4/1993 |
| WO | WO 89/08342 A | 9/1989 |

OTHER PUBLICATIONS

Patent Abstracts of Japan; Publication No. 2003-92829 dated Mar. 28, 2003 and English translation.

* cited by examiner

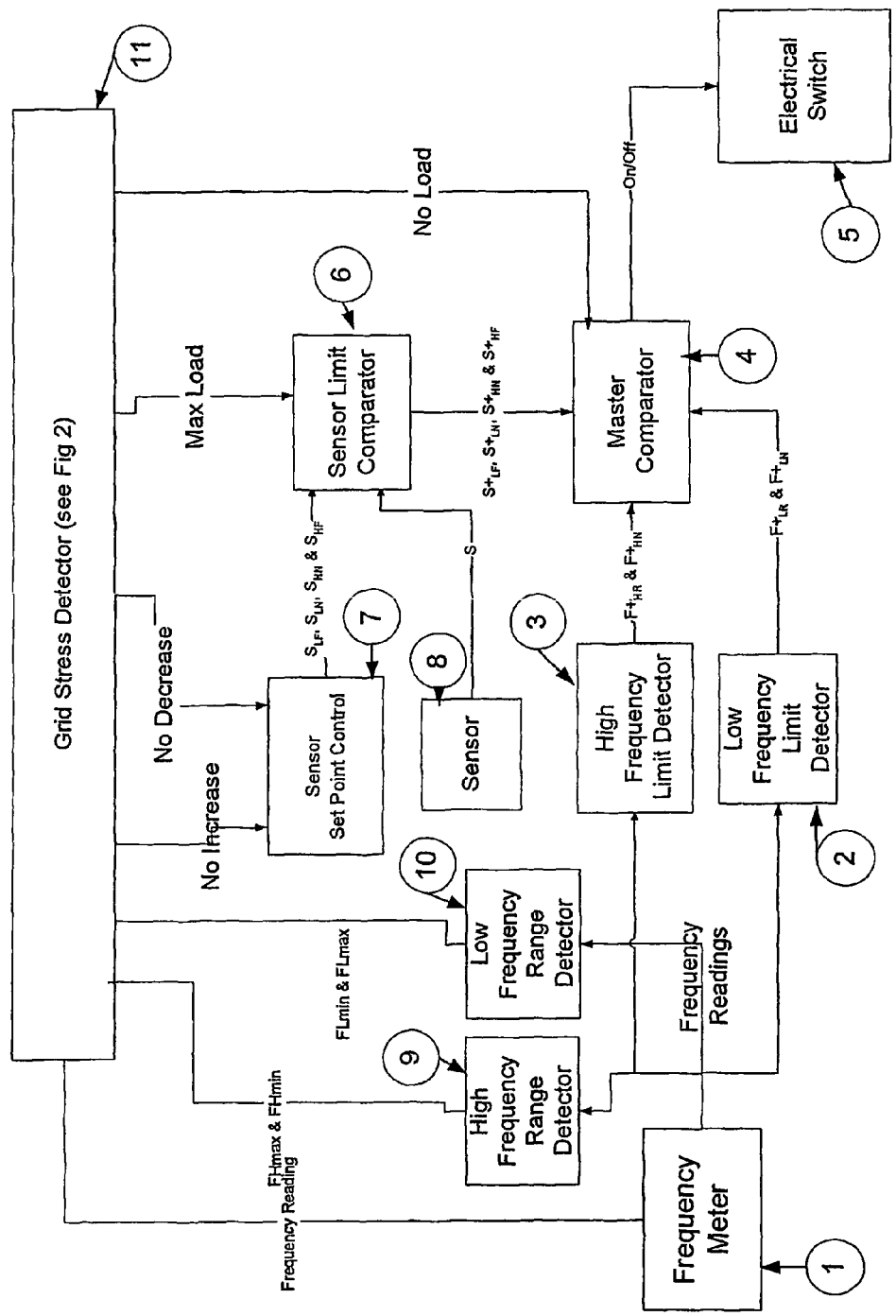
Fig 1. Enhancements to (components of) Responsive Load Controller for Grid Stress Anti Gaming - Block Diagram

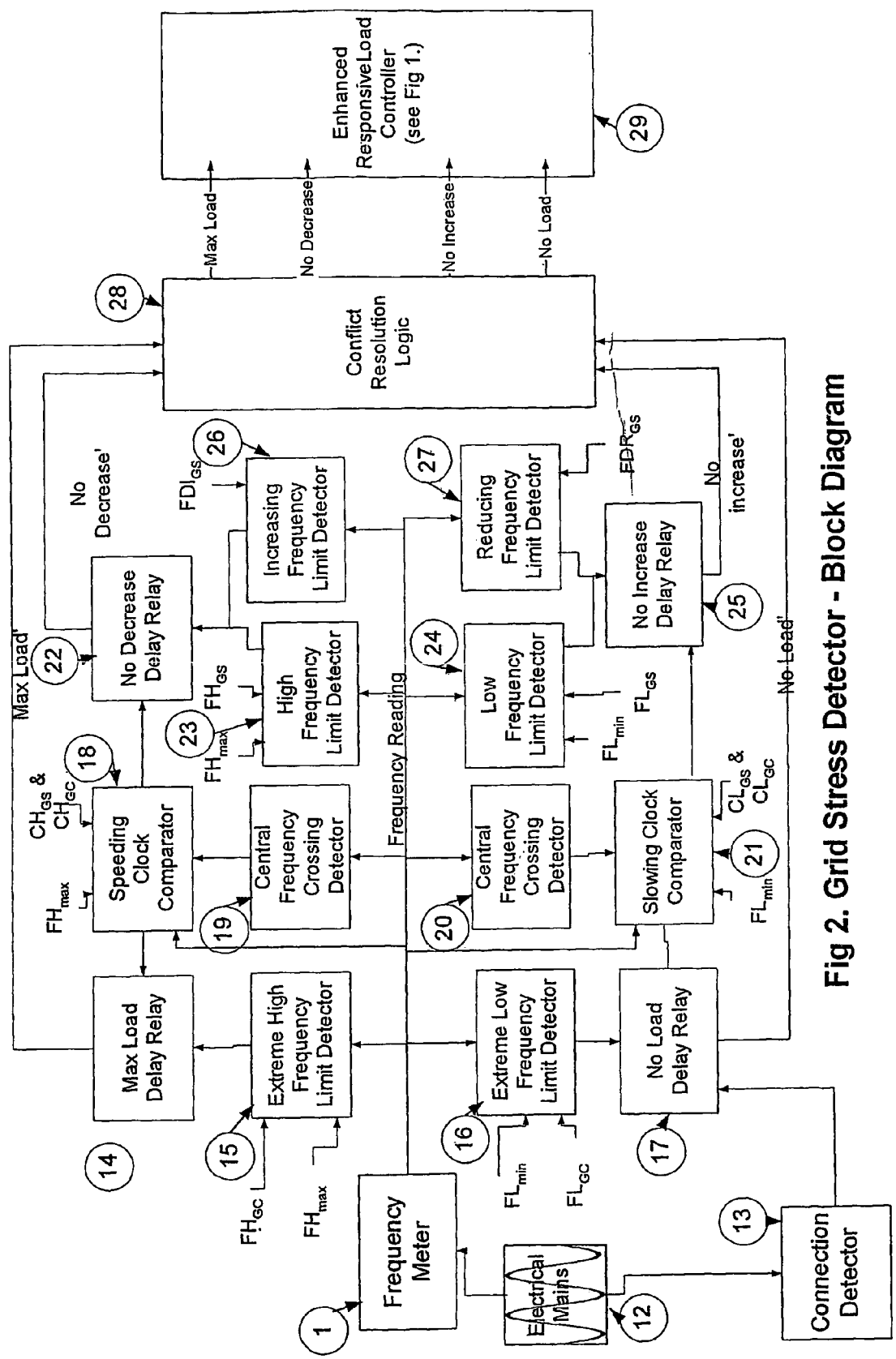
Fig 2. Grid Stress Detector - Block Diagram

GRID STABILISING SYSTEM

BACKGROUND OF THE INVENTION

The present invention relates to a device for controlling an apparatus which consumes mains electric power to be responsive to changes in demand on the mains supply.

To perform their function of safely and reliably distributing electricity from generators to consumers, alternating current electricity grids need to have control systems that keep supply (generation), and demand (load) in very precise balance. The system frequency is the signal by which this control is achieved. The system frequency, usually 50 Hz, 60 Hz or 400 Hz, synchronizes all generation and synchronous load on the system, and varies according to the imbalance. If the load is too high, the system frequency slows down and vice versa. As load is constantly varying, the system frequency also fluctuates, although mechanical inertia in the system limits the rate at which the frequency can change.

The frequency of the system as a whole is influenced by the overall mix of generation and load on the system. Much of the load is 'resistive', e.g. electrical lights, with the load varying according to the voltage at the point of the load. These types of load do not respond directly to changes in the frequency of the system, unless those changes also involve voltage changes.

The system will also have load which is 'synchronous', e.g. electric motors whose speed is locked to the frequency of the system as a whole. When the frequency of the system drops, much of this load actually reduces the energy it consumes, because it goes slower. Thus, the system, when heavily loaded, has an innate ability to respond to demand and, thus, frequency changes, in a useful way.

However, the power generators also have an innate tendency to reduce their output when the frequency of the system drops. This can, therefore, lead to a vicious circle and, unless corrected, leads to unstable operation.

Methods of monitoring this tendency are known, but the conditions associated with this monitoring can be onerous. The conventional frequency control method has been to fit governors onto generators, so that, if the frequency drops, they increase their output, and if the frequency rises, they reduce their output. This works, but relatively slowly. It can take minutes for a generator to fully increase its output in response to a change in frequency, and during this time the frequency is depressed. So quite wide and unpredictable fluctuations in the grid frequency are the norm.

Headroom to increase capacity involves generating capacity that is usually unused and this implies less efficient running of the generator. Headroom to reduce energy is less of a problem, but problems can arise when demand is very low and the baseload plant is already running at minimum capacity.

To retain stability, the system as a whole needs plant which is able to respond automatically with additional dispatch energy essentially equivalent to the largest credible loss of generation (in reality, actually taking into account factors such as the behaviour of the synchronous load, the behaviour of the generation plant and the total load on the system). The largest credible loss of generation is usually considered to be the largest single power unit running. In England and Wales, this is normally Sizewell B at 1.2 GW, but the French Interconnector is also two inputs of 1 GW each. This additional energy must be available before the frequency actually drops below the control limit. In the UK, inertia in the power supply system gives about 10 seconds before limits are breached. Major loss scenarios are considered exceptional, and it is considered acceptable to range beyond the normal 1% frequency deviation limit. Ensuring that this capacity is available is extremely important and is a major consideration and complication in the overall running of the electric supply system. This concern is normally met by holding contracts to pay generators to have governors and to switch them on when requested, and/or by scheduling plant to be only partially loaded.

The service of maintaining the system frequency is known as Response, and in all grids, it is a responsibility of the grid operator to ensure the system as a whole has sufficient Response available to handle short term contingencies. As well as paying generators to have their generators operational, this will often involve purchasing "headroom" so that generators can increase (or reduce) their output when necessary. To ensure grid stability, there must be enough Response available to compensate for possible losses of generation and/or load. If a generator (or the transmission line from it) has a fault, and stops generating, other generation must replace it, generally within a few seconds. If load suddenly stops (as in a power cut across an area), then Response must reduce the generation by an equivalent amount.

If available Response is inadequate, the frequency will not stabilise. If the frequency moves beyond limits, then this will damage much of the equipment connected to the grid. Generators will overspeed (and eventually blow up). Motors will overheat or stall, and other equipment will be damaged. To prevent long term damage, the grid has a variety of "frequency sensitive relays" that look at the frequency and its rate of change, and, if predefined limits are exceeded, will disconnect a portion of the grid or the more local distribution system. So if, for example, the frequency is dropping, these devices will progressively disconnect areas of the country until the frequency stabilizes. Load shedding usually starts automatically before the system frequency drops below 48.5 Hz, i.e. 1.5% less than the controlled limit.

The resulting area blackout is undiscriminating, in that high value uses, such as hospitals and train lines lose power at the same time as less critical loads, such as street lighting or domestic consumption.

If, on the other hand, the frequency is rising, other devices will disconnect generators.

This has to be done automatically, as damage to grid and electrical equipment can occur within sub-seconds of faults arising. Any human intervention is too slow. Grid operators often have prior arrangements with industrial consumers of large loads so that less essential equipment is disconnected before it becomes necessary to disconnect larger areas.

Under some circumstances, cascades of failures can occur. If load is lost, frequency rises, so generation is cut off, so load again exceeds generation and more load is lost. If the control systems are inadequate, large scale blackouts can occur within seconds of a first fault, and we have seen this in the recent blackout in the East Coast of the US. More commonly, as we saw in London, failures are contained to smaller areas.

Once a large scale blackout has occurred, recovery is slow. To start up a generator generally requires generators to have some power available to do so. If no power is available, they cannot start. So grid systems have services, known as "Black Start" services, whereby a subset of generation has the capacity to start and continue generating, even when the rest of the grid is inactive. Grid operators have pre-planned sequences for restoring generation and load. These ensure that the limited initial supplies are used first to provide communication and control, then to start up bigger generators, and thereafter load is progressively connected to match the increasing availability of generation. The entire process of black start is a fraught one. It is a very rare event, and not one that can be practised except in an actual crisis. Everybody involved is under severe pressure, and the systems are being operated quite outside their normal operating range (and sometimes outside their design range). Every step when load or generation is added is a shock to the system, and the grid can take seconds or minutes to stabilise after it happens. Sensible prudence would suggest making changes in small increments. This inevitably slows down the overall process, prolonging the blackout for those who have still to be reconnected.

The present invention aims to:
1. Enhance the Response services, stabilizing the grid before and during crisis, making it more resilient and reliable;
2. Enable much greater discrimination in the loads that are lost when crises arise, so that essential services (such as hospitals, trains and subways) are more likely to remain unaffected;
3. Minimize the extent of blackout during a crisis, so that smaller areas are affected, and larger areas continue to have electricity;
4. Soften the shocks to the system during the Black Start process. Larger loads and areas can be reconnected more quickly, so speeding recovery.

If introduced in a progressive long term way by embedding the inventive device in appliances as they are replaced, all this can be achieved at very low investment cost. Much can also be achieved in the shorter term, but at greater cost in retrofitting or in early retirement of existing equipment.

SUMMARY OF THE INVENTION

Accordingly, the invention provides a responsive load apparatus adapted to be connected to an electric load which consumes intermittent or variable electric energy, the apparatus comprising:
 means for receiving an input indicative of the frequency of the mains power supplied to the system; and
 means responsive thereto to determine a level of stress under which the grid is operating and to control power consumption by said load in accordance with the determined stress level and to prevent adjustment of the power consumption when the stress level exceeds a predetermined maximum threshold value and/or falls below a predetermined minimum threshold value.

Preferably, the device is responsive to the system frequency to prevent the power consumption of the load being increased when a generation shortage (low frequency) grid stress level exceeds a first maximum threshold value and/or being decreased when a demand shortage (high frequency) grid stress level is below a first minimum threshold value.

The "response" of the device can be further improved by making the device responsive to the system generation shortage (low frequency) grid stress level exceeding a second maximum threshold value, higher than the first, to prevent the load consuming power. Also, or alternatively, the device may be responsive to the demand shortage (high frequency) grid stress level being below a second minimum threshold value, lower than the first, to increase the power consumption of the load to a maximum.

Although this device would provide "response" advantages when incorporated into any suitable appliance, the benefits are increased if the device is combined with a responsive load controller which operates to control power consumption based on system frequency and a variable such as temperature which, for the particular appliance, is to be kept within controlled limits. Thus, according to a preferred embodiment, the invention provides a responsive load control apparatus adapted to be connected to an electric load which consumes intermittent or variable electric energy in order to maintain a variable within controlled limits, the device comprising means for controlling the power consumed by the load in response to the frequency of the mains power supplied to the system and the value of said variable;
 means for detecting the frequency of mains power supplied to the system and means for detecting the value of the variable of said load; means for determining the level of instantaneous stress on the grid based on the detected frequency; and wherein said means for controlling the power consumed comprises means for comparing the detected instantaneous stress level with predetermined upper and lower instantaneous stress level thresholds, means for comparing said variable with predetermined upper and lower thresholds, and means for switching off or reducing power supply to the load when said system instantaneous stress level drops below said lower instantaneous stress level limit and said variable is within the range defined by the upper and lower thresholds, and means for switching on or increasing power supplied to the load when said instantaneous stress level is above the upper instantaneous stress level limit and said variable is within the range defined by the upper and lower thresholds; and
 further comprising means adapted to automatically optimise or adjust the predetermined threshold values; and further comprising means to prevent adjustment of the power consumption when the determined stress level exceeds a predetermined maximum threshold value and/or falls below a predetermined minimum threshold value.

The present invention builds on the "ResponsiveLoad" system, described in patent GB2361118. This was an enhancement and extension to a "Frequency adaptive, power-energy re-scheduler", invented by Professor Fred Schweppe of MIT and described in U.S. Pat. No. 4,317,049.

"ResponsiveLoad" operates by having large numbers of consuming devices "listen" to the system frequency, and moderating their behaviour to contribute to grid stability. Many loads operate on a duty cycle, working to keep a controlled variable within defined limits. Fridges, freezers, air conditioners and tank filling pumps are examples of such devices, and for much of their duty cycle, they have discretion as to whether to run or not. That is, if a fridge motor is running, it will usually be in a position to switch off for a while, and do so without detriment to its purpose (the fridge temperature will stay within its required limits).

The "ResponsiveLoad" controller associated with an appliance exploits this discretion and uses the system frequency as a guide (in addition to the controlled temperature) as to when to switch on or off.

An adequate population of ResponsiveLoad devices on a grid causes emergent effects:
 The system frequency is far more finely controlled. Short term fluctuations in frequency are smaller and occur within narrower frequency limits;
 The grid is able to absorb much bigger short term (½ hour or so) imbalances between supply and demand without excursions beyond frequency limits;
 The system frequency becomes a much clearer and more usable signal as to the extent of the supply demand imbalance.

The period over which short term imbalances can be tolerated depends upon characteristics of the devices that provide ResponsiveLoad. The thermal inertia of these cooling devices is used to defer demand, and is, in effect, storage of electricity. Over a short period the average temperature of the cooled thermal mass slightly increases, and is restored when balance is again achieved. Fridges and freezers have quite high internal thermal inertia, and so can defer some demand for some time (even hours).

However the thermal inertia of air conditioners is largely in the spaces that are cooled (or heated), and the fabric of the buildings containing them.

On many grids, air conditioners are a significant part of the peak load, and making them Responsive can provide significant benefits to the grid. Indeed, this is a key economic value delivered by "ResponsiveLoad". In general, this economic benefit will be reflected in some social or economic benefit to the user of a ResponsiveLoad air conditioner, perhaps in the form of a lower cost appliance or a lower electricity tariff. The reward may be no more than the good citizenship of providing a public good. In practice, most ResponsiveLoad air conditioners would also include a frequency sensitive relay that will cut off all the load if the grid frequency goes below a critical level for longer than a short time. The cut-off threshold would be set at some level above that at which part of the transmission or distribution system is disconnected. This has a similar effect to the frequency sensitive relays in the transmission and distribution system, but is far more discriminating in its impact. Faced with a choice between darkness (and other critical disruptions like loss of the trains) or a loss of air conditioning, most rational people would choose to lose air conditioning.

Indeed, the market may well be able to put a price on this discrimination. Those willing to pay higher tariffs can pay extra for the frequency of cut off to be set lower. Critical public services can be allocated the lowest cut-off frequencies.

The change in average temperature of a room or space at times when the air conditioner is providing Response may be perceptible to some users. If users react by "turning up" the air conditioner thermostat, then all the economic benefit of the Response is lost. Indeed, the situation may be made worse, and the user will have gained the economic reward of ResponsiveLoad, but not delivered the service. One aim of the present invention is to prevent "gaming" of this sort.

The effect of the present invention is, e.g., to prevent the user "turning up" the air conditioner etc. at times when the grid is under stress. In effect, the temperature set point becomes fixed (or can be changed only in a "grid friendly" direction) for the duration of the crisis and its aftermath.

When the grid is not under stress, the thermostat may be freely adjusted. A user who wishes "turn up" the air conditioner or fridge thermostat is free to do so. The impact of this on the grid is for a short term increase in the demand, while it achieves the new setting, and thereafter a marginal increase in the consumption to reflect the greater losses. The ability to provide Response when a crisis arises is not impaired by this, as it is achieved by the change in temperature, and not by its absolute value. Unless prevented, users may attempt to bypass the control by disconnecting their appliance and then reconnecting it. A basic ResponsiveLoad system, if used, would then adopt the changed thermostatic reading and the benefit of the ResponsiveLoad would have been lost.

The controller of the invention would detect such reconnection, and moderate the behaviour of the appliance after it is reconnected, allowing it to operate only when the grid is detectably stable and not in crisis.

A reconnection will also arise when the supply across a wide area is reconnected after a blackout, and service was restored to an area. As this is a difficult time for the grid, the behaviour desired of a consuming load in this event is identical to that desired to prevent gaming by the user, so the present device also provides "Black Start Assistance" or BSA.

The owner or controller of a set of ResponsiveLoad devices like this may be in possession of private knowledge about the expected behaviour of the devices. This may allow them to make predictions about the future state of the grid that might be of value to them in wholesale trading. This type of trading is likely to enhance the liquidity and value of the market, rather than be the "free riding" that the invention prevents.

Many implementations of the invention are possible, and it would generally, but not necessarily, be incorporated into the same electronics as the ResponsiveLoad device and any frequency sensitive relay.

BRIEF DESCRIPTION OF THE DRAWINGS

Preferred embodiments will now be described, by way of example only, with reference to the drawings.

FIG. 1 is a block diagram of a system according to the invention;

FIG. 2 is a block diagram of the grid stress detector of FIG. 1.

DETAILED DESCRIPTION OF THE PREFERRED EMBODIMENTS

Referring to FIG. 1, the preferred embodiment comprises a Grid Stress Detector (11) which has, as its input, the incoming grid frequency. Its output would be a (set of) signals, to be passed to the ResponsiveLoad or other power consumption controller, indicating the stress state of the Grid.

The apparatus also includes a power consumption controller which, in the most preferred embodiment is an enhanced ResponsiveLoad controller (to be described further below), which would receive and react to the incoming signals.

The (set of) signals passed from the Grid Stress Detector to the enhanced ResponsiveLoad controller would include:

1. No Load. This indicates the grid is found to be in an seriously overloaded stressed state, and no load should be applied.
2. No increase in the set point and so no increase in load. This indicates that the grid is under short term stress, so the appliance should stay in a deferred demand role, with on-going average reduction in its thermal storage.
3. Unstressed. The device should provide ResponsiveLoad in the normal way.
4. No decrease in the set point and so no decrease in load. This indicates that there is an oversupply on the grid, and that an increase in demand would be grid friendly.
5. Max Load. This indicates that the Grid is seriously under loaded, and that any available additional consumption would contribute to Grid stability.

These signals could be input as separate signals or, preferably combined into a single analogue signal (or a digital equivalent), indicating the extent of the underload or overload stress, and so giving finer control of the ResponsiveLoad behaviour.

One implementation of a Grid Stress Detector is shown in FIG. 2. This embodiment operates to subject the measured frequency of the incoming mains to a variety of tests, each performed by a comparator.

a. Is the frequency within extreme control limits. If not, trigger the relevant No Load or Max load delay relay.

b. Is the grid operating with a deficit or surplus of generation indicated by a period with a low or high frequency excursion. If so trigger the relevant delay relay depending on the threshold.
c. Is the frequency within normal control limits. If not, trigger the appropriate No increase or No decrease delay relay.
d. Is the frequency changing within normal rate of change limits. If not, trigger the appropriate No increase or No decrease delay relay.

The delay relays are devices that, once triggered, stay set for a predetermined period. So if the No Load delay relay is triggered, the No load output signal stays set for the predefined period.

Various methods of setting the limits used can be used. The extreme control limits may be set by statute, or may be "purchased" from the grid operator. Other limits may best be calculated by using some function of the extremes experienced over a previous period.

Although the preferred embodiment has been described for use with the "ResponsiveLoad" device of GB-2361118, this is a preferred embodiment only. The device of the present invention may be used alone, or in combination with other control devices.

In the preferred embodiment, the device is combined with a responsive load controller such as described in GB 2361118. The sensor limits ($S_{LF}$, $S_{LN}$, $S_{HN}$, $S_{HF}$) are chosen to match the requirements of the appliance under control and can be varied in the same way as a normal set point controller 7. In a refrigerator, for example, they are derived from the thermostat control.

The difference between the normal and frequency responsive limits are derived such that the load is responsive for a reasonable portion of the time. For low frequency response, this is the 'duty cycle' of the device. Furthermore, the difference between the normal and frequency responsive limit is set so that the device will stay off, or stay on, when being frequency responsive, for a reasonable period of time. In general, this will be around 10 to 15 minutes, when there is no disturbance to the appliance, such as the refrigerator door being opened.

Clearly, the more responsive the appliance is to changes in frequency, and, thus changes in demand on the overall supply system, the greater its value to the system.

The frequency limits ($F_{LR}$, $F_{LN}$, $F_{HN}$, $F_{HR}$) are preferably chosen so that a population of responsive devices will progressively respond in a precisely controlled way, as excursions from the nominal frequency become greater. The optimum scheme for selection of the frequency limit distributions, which need not be the same for low and high frequency excursions, will depend on the most desired characteristics for control the particular electricity system to which the population of devices is connected, and may change as the number of devices and the overall characteristics of the network change.

Preferably, the frequency limit distributions are selected such that the extent of the deviation from the nominal frequency gives a monotonically increasing, and, ideally, linear, indication of the volume of energy necessary to restore the system to balance.

Preferably, the response should be all 'used up' at the point when the frequency has reached other control limits and other reserve needs to be brought in.

The control limits may have a skewed normal distribution, or similar, to achieve this in ways which match the available reserve.

The limits for a particular device should preferably reflect the 'duty cycle' of the device. The high and low frequency responses should reflect the different needs and value for the different types of responses.

The limits may also be adjusted to take into account the current state of the controlled variable so that devices approaching their normal switching points are preferred over others. This will have the effect of minimizing the number of switching operations occurring with the devices.

The nominal frequency or central frequency may be chosen by monitoring the frequency of the mains when the device is first switched on and selecting as a central frequency whichever standard frequency is closest to the detected signal (e.g. 50 Hz, 60 Hz or 400 Hz).

There are various ways in which the frequency limits for each particular device, may be arrived at.

Appropriately distributed limits may be pre-programmed into the population and devices to be connected to the system. Thus, different devices will have response characteristics that are static over time.

Alternatively, randomization can be used, so that individual devices react in a random manner, matching the overall distribution required. This ensures that any disadvantage associated with having a responsive device is randomly distributed across the population of devices.

The parameters of the randomization may be adjusted in the light of the variation of the frequency over a given period. For example, the highest and lowest system frequencies may be recorded for every hour, or some other measurement period. Each day, for example, the most recent extremes for the most recent measurement period may be compared with extremes for the equivalent measurement period recorded in earlier days.

If the extremes are greater, the historical extreme may then be increased by a proportion of the difference. This proportion is chosen as a parameter which may be different for upper and lower frequency limits. The proportion chosen may be a more complex function of previous frequency measurement using proportional, integral and derivative (PID) control techniques. For example, a simple proportional figure of 0.25 is a figure that will adjust the limit in the experience of the past week or so.

If the extremes are smaller for the day of measurement, the historical extreme may then be reduced by a proportion of the difference. As with increasing extremes, the parameter sets the amount by which the limits will change. There may be separate limits for every hour, or other such measurement period, of the day. There is no need for clock synchronization, as the devices will each optimise for the measurement periods as they choose them.

Following a power failure, all of the hourly (or measurement period) limits would be set to the average.

Preferably, the device will continue to provide response for as long as the controlled device is in use. This essentially means that the response service provided would have been paid for at the time of installation of the responsive load controller and would, in effect, be a capital purchase or long term contract agreement by a representative of the system as a whole.

However, there may not be such a representative available or willing to pay an appropriate fee. If, for example, the representative was franchised for a limited period, and the representative changed, the incoming representative would have no incentive to pay for the ongoing service of response and yet would continue to receive the benefit.

Thus, the control device may optionally include a control receiver which monitors one or more radio frequency signals.

These may be signals such as the BBC 198 kHz long wave transmission signal which includes a digital control signal in its modulation; the short range digital control signals known as 'BlueTooth'; modulations of Global Positioning System signals or similar satellite transmission signals (e.g. Geodesic or Iridium); or signals designed for communication with meters and used by a population of meter readers.

The control receivers would be preloaded with a range of internal identifiers, secret to the authority controlling the devices. These identifiers would act as keys to decrypt incoming signals in such a way that only the controlling authority could construct a signal that would be recognized by the device. The number of devices that would recognize a particular signal would depend upon the nature and need of the forecast market for response, and on the coverage of the broadcast signal monitored. It is anticipated that a BBC long wave signal would activate or deactivate a few 10s of MW of response.

The need to encrypt the signal in this way arises from the possibility that, if responsive load devices were not protected in this way, an electricity system could be destabilized by a hostile broadcast of a signal that deactivated a large volume of response.

As mentioned above, the responsive load control device of the present invention may be used with any device that consumes intermittent or variable electric energy to maintain a variable within controlled limits. Such devices include, without limitation, domestic and industrial refrigerators and deep-freezers; air conditioning units in domestic, commercial and industrial applications, pumps for pump storage systems, including water and other supply tanks; electric heaters, e.g. domestic immersion heaters, heaters in washing machines and dishwashers; or storage heaters (although these would be useful only during particular periods of the day).

The responsive load controller may be in the form of a Programmable Logic Controller (PLC) programmed to operate in the manner described. The controller can, however, also be built using discrete logic or built in a single integrated circuit.

The circuitry includes a frequency meter which produces a signal proportional to the measured frequency of the mains, which is input to the control device.

A central frequency detector produces a central frequency signal indicating the essential or nominal frequency that the controller is aiming to support. This preferably creates a signal from standard 50 Hz, 60 Hz or 400 Hz frequencies, selecting that which is closest to the detected frequency, when the load is switched on.

The high frequency range detector processes the incoming frequency of the system over a set of sample periods, to derive the range of frequency above the central frequency, over which the controller is to be active. The output is a maximum frequency at which high frequency control will always have been attempted, and a minimum frequency below which high frequency control will never be attempted. A low frequency range detector processes the incoming frequency over a set of sample periods to derive the range of frequencies below the central frequency over which the controller is to be active. The output is a minimum frequency at which low frequency control will always have been attempted, and a maximum frequency above which low frequency control will never be attempted.

A startup voltage detector measures the voltage at the instant the device is first switched on. This is not related to any fixed parameters and is effectively uncontrollable. It is, therefore, a reasonably reliable source of a random signal which can act as a trigger to a random range selector.

A normal random range selector creates a random signal, within the logic range 0-1, distributed according to, for example, the normal distribution or some other similar statistical distribution. One embodiment uses a single random range selector. However, it may be more appropriate to have two, one for high and one for low, with different distributions, or with different skewing of the normal distribution.

A high frequency limit selector processes the minimum or maximum frequency values and the random signal to produce the control limits $F_{HR}$ and $F_{HN}$. This ensures that the limits set in a population of devices will be distributed to maximise the control benefit.

A low frequency limit selector processes the low frequency limit signals and the random signal to produce the control limits $S_{LR}$ and $S_{LN}$. This ensures that the limits set in a population of devices will be distributed to maximize the control benefit.

A sensor detects the level of the parameter the system is intended to control.

A sensor setpoint control is used to adjust the central point around which the controller is to control, and form the parameter limit signals $S_{LF}$, $S_{LN}$, $S_{HN}$ and $S_{HF}$.

A sensor limit comparator takes these sensor limit signals and compares them with the actual sensor signal to produce logic signals indicating respectively when the various limit signals have been exceeded.

A master comparator performs logic operations to compare the incoming logic signals indicating whether the frequency and sensor limit signals have been exceeded and produces an on/off signal.

An electric switch is provided for switching the load on or off.

The enhancement provided by the present invention provides a further control within the framework of the responsive load control so as to prevent gaming or overriding the response features, as described above. The controller is thus adapted or enhanced such that further divisions of the frequency ranges are used.

In more detail, with reference to FIG. 1, the responsive load controller comprises a frequency meter 1, high and low frequency limit detectors 2, 3, a master comparator 4, an on/off switch 5, a sensor limit comparator 6, a setpoint controller 7, a sensor 8 and high and low frequency range detectors 9, 10.

The frequency of the grid is detected by the frequency meter 1. The frequency readings are fed to the low frequency limit detector 2 and the high frequency limit detector 3. These detectors determine whether the frequency exceeds the high frequency limit or is below the low frequency limit.

The sensor limit comparator compares the sensor readings with the sensor setpoint control values for the appliance.

The master comparator compares these values as described above.

The output of the master comparator 4 controls the power consumption of the appliance and/or switches the appliance off in accordance with the comparison, again as described above.

The present invention modifies this system by the integration of a grid stress detector 11. The grid stress detector 11 will now be described in more detail with reference to FIG. 2.

Frequency meter 1 detects the frequency of the electrical mains 12. A connection detector 13 detects whether the appliance is connected to the mains.

The present invention then provides means for determining, from the frequency measured by the frequency meter 1, the stress level of the system. The stress level values are then used to send a signal to the ResponsiveLoad control system as described above such that, within the response of the ResponsiveLoad controller, when the grid is under a high degree of stress, the appliance is controlled such that its power consumption cannot be increased and/or when the grid is underused, i.e. has a very low stress level, the power consumption cannot be decreased. In a preferred embodiment, when the stress level detector determines that the stress level of the grid is extremely high, i.e. at a maximum, it provides an indication to the ResponsiveLoad controller that the appliance should be switched off, i.e. should not consume any power. Conversely, when the use of the grid is extremely low, i.e. the stress level is extremely low (a minimum), a signal is provided from the grid stress detector to the ResponsiveLoad controller to ensure that the appliance works as a maximum load, i.e. consumes maximum power from the system.

Essentially the modification provided by the invention involves incorporation of the grid stress detector described above and shown in detail in FIG. 2. The known ResponsiveLoad system has, for each appliance, threshold frequencies. When the grid frequency falls below the lower limit the appliance is switched off or set to consume less power. With the extension provided by the present invention, the device also has an associated stress level threshold beyond which the "setpoint" of that appliance is fixed and/or the power consumption cannot be adjusted.

The preferred grid stress detector arrangement is shown in FIG. 2

The system frequency is provided to each of an extreme high frequency limit detector and an extreme low frequency limit detector 15, 16, a speeding clock comparator and a slowing clock comparator 18, 21, a central frequency crossing detector 19, 20, a high frequency limit detector and a low frequency limit detector 23, 24 and an increasing frequency limit detector and a reducing frequency limit detector 26, 27.

In the event that the extreme high frequency limit detector determines that the grid frequency is greater than a maximum stress level value, this operates to close the max load delay relay 14 and an appropriate signal is sent to the conflict resolution logic block 28 which outputs a 'max load' signal to the ResponsiveLoad controller 29. The limit against which the frequency is tested may be a parameter $FH_{GC}$ (High Frequency for Grid Crisis) fixed for the device. Alternatively, the $FH_{CG}$ may be modulated by a signal $FH_{max}$. $FH_{max}$ is received from the High Frequency Range Detector 9, so that the general stability influences the point at which the grid stress is determined.

The max load delay relay 14 sets an output signal for a fixed time following the signal input from the extreme high frequency limit detector. This ensures that, once detected, signals indicating the high stress levels are maintained for long enough for the ResponsiveLoad device to react, and to avoid repeated short switching.

If the extreme low frequency limit detector 16 determines that the frequency from the frequency meter 1 is less than a minimum threshold, this triggers the no load delay relay 17 which provides a corresponding signal to the conflict resolution block 28 which outputs a 'no load' signal to the enhanced ResponsiveLoad controller. The limit against which the frequency is tested may be a parameter $FL_{GC}$ (Low Frequency for Grid Crisis) fixed for the device. Alternatively, the $FL_{GC}$ may be modulated by a signal $FL_{min}$. $FL_{min}$ is received from the Low Frequency Range Detector 10, so that the general stability influences the point at which grid stress is determined.

The no load delay relay 17 sets an output signal for a fixed time following the signal input from the extreme low frequency limit detector. This ensures that, once detected, signals indicating the high stress levels are maintained for long enough for the ResponsiveLoad device to react, and to avoid repeated short switching.

If the frequency levels do not exceed the maximum and/or minimum levels, but are determined by the high and low frequency limit detectors 23, 24 to exceed one or other of the upper and lower stress level thresholds, the appropriate one of the no decrease delay relays 22 and no increase delay relays 25 is triggered to provide a corresponding 'no decrease' or 'no increase' signal to the conflict resolution box 28 which then conveys corresponding signals to the ResponsiveLoad controller 29.

The high frequency limit may be a parameter $FH_{GS}$ (high frequency grid stress), or derived from $FH_{GS}$ by a signal $FH_{max}$ derived from the high frequency range detector 9. This ensures that even quite short, but significant, frequency excursions are used in the grid stress detection. The low frequency limit may be a parameter $FL_{GS}$ (low frequency grid stress) or derived from $FL_{GS}$ by a signal $FL_{min}$ derived from the low frequency range detector 10.

The no increase delay relay 25 is triggered by incoming signals, and holds the output signal "No Increase" constant for the period of the delay. This ensures that any fleeting signal indicating grid stress is preserved for a minimum time to give the ResponsiveLoad controller time to react without too much switching.

The increasing frequency limit detector 26 compares the rate of change of the frequency signal with a parameter $FDI_{GS}$ (frequency delta increasing for grid stress). If the limit is exceeded, then the trigger signal is passed to the No Increase delay relay 25. This ensures that rapid changes in frequency, whatever their absolute value, are also used as indicators of grid stress.

The conflict resolution logic 28 ensures that only a single signal is passed on to the enhanced ResponsiveLoad controller. One embodiment of conflict resolution is to treat the incoming signals in a priority order, and ensure only the highest priority signal is passed on.

Stress levels can also be determined on the basis of clock frequency comparison. This part of the detector relies on the fact that grid stress can be indicated by an integration, over time, of the scale of the departure of the grid frequency from its central point (normally 50 Hz, 60 Hz or 400 Hz). Thus, the longer the grid frequency is below or above the central frequency, and the further it is above or below the central frequency, the greater the stress.

The preferred embodiment of the stress detector shown in FIG. 2 performs this integration by measuring how much a clock driven by the main frequency is changing or differs from a more accurate clock. Thus, a drift of, for example, 1 second in the clock can arise from a long period only slightly below the central frequency, or a shorter period with a longer excursion from the central frequency. If this clock shift is compared with parameters given in seconds, this gives a convenient measure (in units of time) of the stress level of the grid.

The integration requires a starting point, and a useful starting point is when the frequency crosses the central frequency. Thus, when the frequency passes from below the central frequency to above the central frequency, the drift (the high frequency stress) is reset to zero and the integration measure starts. Similarly, for low frequency stress, the frequency passes from above the central frequency to below it, the clock is reset and integration starts again.

This integration is carried out, in the system shown in FIG. 2, by the central frequency crossing detector (19, 20), the speeding clock comparator 18 and the slowing clock comparator 21.

Four parameters can be used:

$CH_{GS}$—clock high frequency for grid stress. This is the drift permitted on the high frequency clock comparator before grid stress is indicated;

$CH_{GC}$—clock high frequency for grid crisis. This is the drift permitted on the high frequency clock comparator before a grid crisis is indicated, requiring immediate use of all optional load if this can be done safely;

$CL_{GS}$—clock low frequency for grid stress. This is the drift permitted on the low frequency clock comparator before grid stress is indicated;

$CL_{GC}$—clock low frequency for grid crisis. This is the drift permitted on the low frequency clock comparator before a grid crisis is indicated, requiring immediate removal of all optional load.

The preferred setting of these parameters may depend upon the broadest stability of the grid and so may be modulated by the history of variation of high frequency which can be detected by the high and low frequency range detectors of the RespondiveLoad controller described above. These devices derive the high and low frequency limits within which the responsive load is active by analysis of the history of the frequency. Thus, the maximum high frequency limit ($FH_{max}$) may be used to change $CH_{GS}$ and $CH_{GC}$. When the grid is more stable, and thus $FH_{max}$ is lower, $CH_{GS}$ and $CH_{GC}$ can be lower. The same applies for the low frequency parameters.

The responsive reading is passed to a central frequency crossing detector 19. When the frequency crosses from below to above the central frequency, this sends a reset signal to the speeding clock comparator 18. The speeding clock comparator integrates the excursions of frequency, so giving good indicators of grid stress. A convenient way of doing this is to compare the difference since the reset in a reference clock and in a clock derived from the frequency. This difference is then compared with the parameters that determine the grid stress levels, $CH_{GS}$ and $CH_{GC}$. These limits may be modulated by the frequency range signal $FH_{max}$. When the limits are exceeded, appropriate signals are passed to the max load delay relay or the no decrease delay relay.

The frequency reading is also passed to a further central frequency crossing detector 20. When the frequency crosses from below to above the central frequency, this sends a reset signal to the speeding clock comparator 18. The speeding clock comparator integrates the excursions of frequency, so giving good indicators of grid stress. A convenient way of doing this is to compare the difference since the reset in a reference clock and in a clock derived from the frequency. This difference is then compared with the parameters that determine the grid stress levels, $CH_{GS}$ and $CH_{GC}$. These limits may be modulated by the frequency range signal $FH_{max}$. When the limits are exceeded, appropriate signals are passed to the max load delay relay or the no decrease delay relay.

The frequency reading is also passed to a further central frequency crossing detector 20. When the frequency crosses from above to below the central frequency, this sends a reset signal to the slowing clock comparator 21. The slowing clock comparator integrates the excursions of frequency, so giving good indicators of grid stress. A convenient way of doing this is to compare the difference since the reset in a reference clock and in a clock derived from the frequency. This difference is then compared with the parameters that determine the grid stress levels $CL_{GS}$ and $CL_{GC}$. These limits may be modulated by the frequency range signal $FL_{min}$. When the limits are exceeded, appropriate signals are passed to the No Load delay relay 17 or the No Increase delay relay 25.

The No Decrease delay relay 22 is triggered by incoming signals, and holds the output signal "No Decrease" constant for the period of the delay. This ensures that any fleeting signal indicating grid stress is preserved for a minimum time to give the ResponsiveLoad controller time to react without too much switching.

Signals derived from the speeding clock parameter 18 and/or the slowing clock parameter 21 trigger, as appropriate, the relays 14, 22, 17 or 25 and provide appropriate signals to the conflict resolution logic block 28 which provides appropriate signals to the responsive load controller.

Thus, as described above, the responsive load controller may be used within a device which consumes intermittent load or variable load from the mains system in order to maintain an internal variable within controlled limits. With a population of devices controlled in this way, using appropriate control limits, the frequency of the system as a whole can be stabilized, providing the benefits discussed above. With this device, the consumer can participate in and exercise some control over the response of the system which provides the advantage that when demand on the systems is high, the system response is not indiscriminate, but optimized according to the value of response and the importance of power supply to consumers, as determined by them. The effect of the responsive load control is a slightly wider range over which the controlled variable may range, and the 'consumer end' can decide whether this is acceptable, according to the nature of the device.

Of course, as mentioned above, the grid stress detection responsive load apparatus need not be incorporated in a responsive load controller as described above. The invention, which is a system which controls whether or not power can be consumed by an appliance in dependence on the stress level of the grid may form a simpler system which does not have the additional load response advantages described above. For example, the invention could be realised in the form of a grid stress detector which measures the frequency of the grid, determines, based on the measured frequency, the stress level of the grid and prevents adjustment of the power consumption of the appliance if the stress level is above and/or below a predetermined threshold. Thus, any appliance fitted with the device, could be controlled to be switched off or so that it cannot be 'turned up' when the grid is highly stressed. Without the responsive load controller described above, this would not depend on the value of particular parameters of the appliance e.g. in the case of a refrigerator, the temperature and different appliances would not have different setpoints. This would give less scope for trading, but still clearly has advantages in terms of response to grid stress levels.

The invention claimed is:

1. A responsive load device adapted to be connected to an electric load which consumes intermittent or variable electric energy to maintain a variable of the load between upper and lower limits of the variable, the upper and lower limits of the variable being derived from and defined around a setpoint of the variable, the apparatus comprising:

means for receiving an input indicative of the frequency of the mains power supplied to the load from a grid; and means responsive thereto to determine a level of stress under which the grid is operating and to control power consumption by said load in accordance with the determined stress level and to prevent the setpoint being increased or decreased in order to make power consumption be increased when a generation shortage grid stress level exceeds a first maximum threshold value and/or to prevent the setpoint being increased or decreased in order to make the power consumption be decreased when a demand shortage grid stress level is below a first minimum threshold value, wherein the device is responsive to the demand shortage grid stress level being below a second minimum threshold value, lower than the first, to increase the power consumption of the load to a maximum.

2. The device of claim 1, wherein the device is responsive to the system generation shortage grid stress level exceeding a second minimum threshold value, higher than the first, to prevent the load consuming power.

3. A responsive load device adapted to be connected to an electric load which consumes intermittent or variable electric energy to maintain a variable of the load between upper and lower limits of the variable, the upper and lower limits of the variable being derived from and defined around a setpoint of the variable, the apparatus comprising:

means for receiving an input indicative of the frequency of the mains power supplied to the load from a grid;

means responsive thereto to determine a level of stress under which the grid is operating and to control power consumption by said load in accordance with the determined stress level and to prevent the setpoint being increased or decreased in order to make power consumption be increased when a generation shortage grid stress level exceeds a first maximum threshold value and/or to prevent the setpoint being increased or decreased in order to make the power consumption be decreased when a demand shortage grid stress level is below a first minimum threshold value;

responsive load control apparatus adapted to be connected to the electric load which consumes intermittent or variable electric energy in order to maintain a variable within the controlled upper and lower limits;

means for controlling the power consumed by the load in response to the frequency of the mains power supplied to the system and the value of said variable; means for detecting the frequency of mains power supplied to the electric load and means for detecting the value of the variable of said load; means for determining the level of instantaneous stress on the grid based on the detected frequency; and wherein said means for controlling the power consumed comprises:

means for comparing the detected instantaneous stress level with predetermined upper and lower instantaneous stress level thresholds, means for comparing said variable with predetermined upper and lower thresholds, means for switching off or reducing power supply to the load when said system instantaneous stress level drops below said lower instantaneous stress level limit and said variable is within the range defined by the upper and lower thresholds,and means for switching on or increasing power supplied to the load when said instantaneous stress level is above the upper instantaneous stress level limit and said variable is within the range defined by the upper and lower thresholds; and means adapted to automatically optimise or adjust the predetermined threshold values.

4. A method for controlling an electric load which receives electrical power from a grid, said electric load consuming intermittent or variable electric energy to maintain a variable between upper and lower limits of the variable, wherein the upper and lower limits are derived from and defined around a setpoint of the variable, said method comprising the steps of:

determining a stress level of the grid from a frequency of the electrical power received by the electric load, preventing an increase of the setpoint when the determined stress level exceeds the predetermined maximum threshold and/or preventing a decrease of the setpoint when the determined stress level falls below the predetermined minimum threshold, and maximising the power consumed by the electric load when the determined stress level of the grid falls below a second minimum threshold, less than the first.

5. The method of claim 4, further comprising the step of:
preventing the electric load from consuming power when the stress level of the grid exceeds a second maximum threshold, greater than the first.

6. The device of claim 3, wherein the device is responsive to the system generation shortage grid stress level exceeding a second minimum threshold value, higher than the first, to prevent the load consuming power.

7. The device of claim 3, wherein the device is responsive to the demand shortage grid stress level below a second minimum threshold value, lower than the first, to increase the power consumption of the load to a maximum.

* * * * *